May 8, 1951

E. I. ANDERSON 2,552,303

SWEEP CIRCUITS

Filed Nov. 29, 1948

INVENTOR
Earl I. Anderson
BY
ATTORNEY

Patented May 8, 1951

2,552,303

UNITED STATES PATENT OFFICE 2,552,303

SWEEP CIRCUITS

Earl I. Anderson, Manhasset, N. Y., assignor to Radio Corporation of America, a corporation of Delaware Application November 29, 1948, Serial No. 62,575

5 Claims. (Cl. 250—36)

Figure 1:
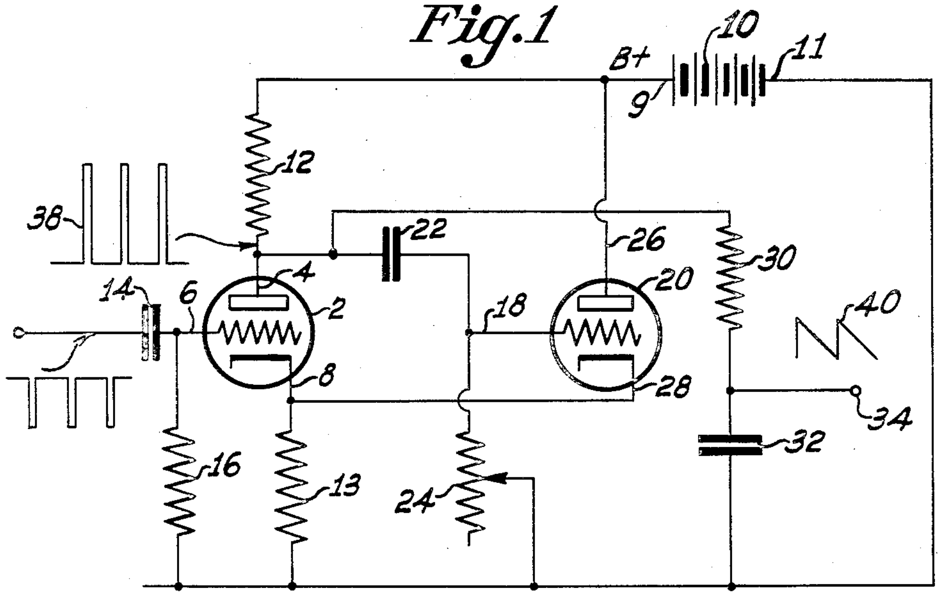

This invention relates to improvements in apparatus for generating voltage waves used in the deflection of cathode ray beams in equipment incorporating cathode ray tubes.

In particular, this invention provides a circuit arrangement whereby negatively sloped sawtooth voltage waves are derived from a cathode coupled multivibrator.

Most television receivers and transmitters require that a positive going sawtooth voltage or current wave be provided at the input to the deflection circuits, and conventional sawtooth generators have this type of output. However, in some types of television receivers or transmitter equipment it is necessary to introduce negatively sloped sawtooth voltage or current waves to the deflection circuits, and this is normally accomplished by the addition of an extra amplifier so as to invert the positively sloped sawtooth voltage or current wave. In many deflection circuits it is necessary to provide both positively and negatively sloped sawtooth voltage or current waves that are exactly in phase.

Ordinarily multivibrators of the grid coupled type are used to provide sawtooth waves, and an extra tube is sometimes introduced into the circuit in order to eliminate any interaction between the multivibrator and the external circuit used to stabilize or control its action. This additional tube is not required if a cathode coupled multivibrator of the type herein described is used.

By elimination of the waveform inverting amplifier and the coupling tube, the initial expense of the equipment is lowered and its reliability is increased.

Accordingly, it is one purpose of this invention to produce a negatively sloped sawtooth voltage or current wave of the type required by the sweep circuits in standard television transmitters or receivers with a minimum number of circuit components.

It is a further purpose of this invention to produce a negatively sloped sawtooth voltage waveform that is suitable for use in cathode ray deflection circuits by use of a cathode coupled multivibrator without the addition of an extra amplifier.

Another purpose of this invention is to produce negatively sloped sawtooth voltage waves that are synchronized with any of a series of uniformly spaced pulses, without interaction between the circuits of the sawtooth generator and the pulse forming system or pulse source.

Still another object of this invention is to simultaneously produce positively and negatively sloped sawtooth voltage waves with a minimum number of circuit components.

It is a further object of this invention to simultaneously produce positively and negatively sloped sawtooth voltage or current waves that are synchronized with any of a series of uniformly spaced pulses without interaction between the circuits of the pulse source and the sawtooth generator.

Figure 2:
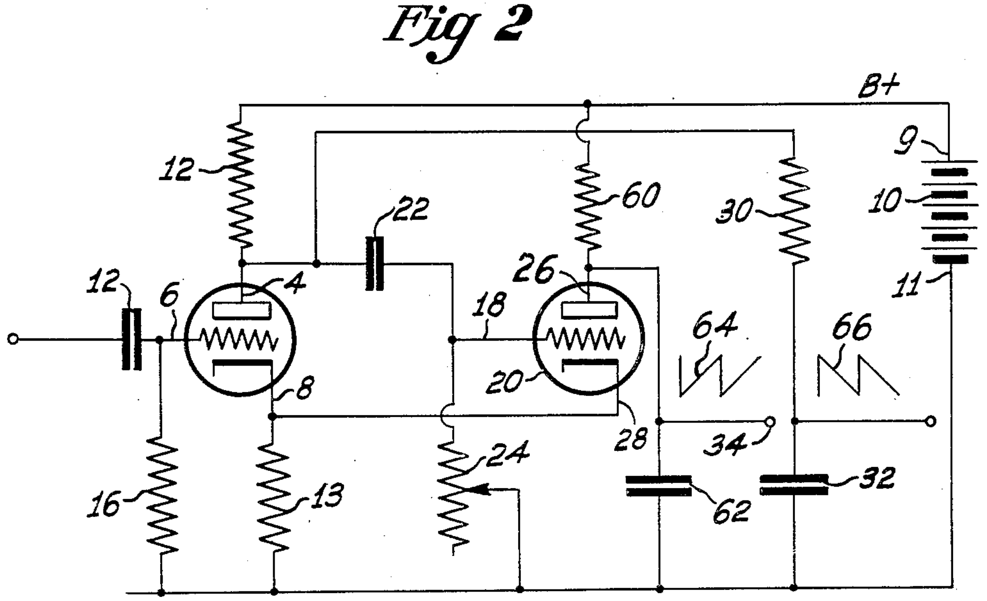

Various other purposes and advantages will become more apparent to those skilled in the art from the following detailed description, particularly when considered in connection with the drawing wherein like reference numerals indicate like parts and wherein:

Figure 1 shows a cathode coupled multivibrator circuit arrangement for producing negatively sloped sawtooth voltage waves having a combination of circuit elements that constitutes the present invention, and Figure 2 shows a cathode coupled multivibrator circuit arrangement for simultaneously producing both positively and negatively sloped sawtooth voltage or current waves in phase, i. e. in push-pull.

In the type of cathode coupled multivibrator illustrated by the drawings two electron tubes are involved, one of which is adapted to receive a series of negative synchronizing pulses, and the other is coupled to the first in such manner that the arrival of a negative synchronizing pulse at the first tube causes the second to conduct heavily and bias the first tube negatively for a predetermined interval. An integration circuit is connected to the plate of the first tube to provide a source of negatively sloped sawtooth voltage waves.

Referring to Figure 1 in detail there is shown an electron tube 2 having a plate 4, a grid 6, and a cathode 8, the plate 4, being connected to one side 9 of a source of direct current potential 10 through a plate load resistor 12, and the cathode 8 being connected to the other side 11 of the source 10 through a cathode bias resistor 13. Synchronizing pulses are applied to the grid via coupling condenser 14, and grid leak resistor 16, and the plate of tube 2 is coupled to the grid 18 of the second tube 20 by condenser 22 and variable grid resistor 24. The plate 26 of tube 20 is preferably connected directly to the source of direct current potential 10, and its cathode 28 is connected directly to the cathode 8 of amplifier 2 so that resistor 13 is common to the cathode circuits of both amplifiers. An integrating circuit comprising a resistor 30 and a condenser 32 is connected between the plate 4 of tube 2 and side 11 of the source of direct current potential 10, the output of negatively sloped sawtooth waves being derived at terminal 34.

In operation, one of the series of negative pulses 36 reduces the conductivity of tube 2, and accordingly the plate voltage rises, as shown by the wave forms 38. This sudden rise in the potential at anode 4 causes condenser 22 to charge rapidly through resistor 24. The effect is cumulative since the sudden positive rise in voltage on the grid of tube 20 causes it to conduct heavily and increase the negative bias on tube 2 by means of the common cathode load resistor 13. When the negative pulse is no longer present at the grid 6 tube 2 again conducts and the voltage at plate 4 changes in a negative direction. As a result condenser 22 discharges (through tube 2) at a rate that is variable in accordance with the setting of variable resistor 24 and in so doing biases tube 20 so that it conducts no current. This in turn reduces the bias on tube 2 so that the change in potential at plate 4 becomes more negative and the effect is therefore seen to be cumulative. The discharge current from condenser 22 gradually decays until the combination of one of the negative pulses 36 and the increased cathode bias is sufficient to again reduce the conduction of tube 2 to a low level. A positive pulse corresponding to those shown at 38 appears on the plate 4 and the cycle is repeated.

During the positive pulse at the plate 4 condenser 32 is quickly charged as indicated by the waveforms 40. In the period in between positive pulses condenser 32 slowly discharges through resistor 30 and tube 2.

The circuit arrangement shown in Figure 2 is similar to that shown in Figure 1 with the exception that a plate load resistor 60 is connected in the circuit between the plate 26 of tube 20 and side 9 of the power supply 10. A condenser 62 is also added between the plate 26 and the other side 11 of the power supply 10.

Therefore, when the condenser 22 discharges and tube 20 is either cut off or very nearly so, the potential at plate 26 changes in a positive potential direction and condenser 62 is slowly charged through plate load resistor 60 and the power supply 10. However, when a negative pulse arrives at the grid 6 and tube 20 conducts heavily, condenser 62 rapidly discharges through the tube 20 to produce a positively sloped waveform such as shown at 64. The negatively sloped sawtooth wave 66 is produced in the same manner as described in connection with Figure 1.

Through the use of the circuits disclosed herein it is seen that a negatively sloped sawtooth voltage wave may be developed without the customary addition of an inverting amplifier and that the necessity for one of the plate load resistors is eliminated. It is further seen that positively and negatively sloped waves may be produced with a minimum number of components.

Whereas this circuit has been described as being of importance with respect to the television art, it is realized that it may be used with other types of apparatus.

I claim:

1. An oscillator circuit for generating negatively sloping sawtooth waves comprising a source of direct current potential, a first impedance, a first electron tube, and a second impedance successively connected in series with said source, a second electron tube connected in parallel with the first impedance and the first tube, each of said tubes including at least a cathode, a control electrode and an output electrode, a condenser connected between the output electrode of the first tube and the control electrode of the second, an impedance connected between the control electrode of the second tube and the junction between the second impedance and the source of potential, and an integrating circuit including a condenser and an impedance connected in parallel with said first tube and said second impedance so as to develop across said last mentioned condenser a negatively sloped sawtooth voltage wave.

2. A sweep generator circuit for generating negatively sloped sawtooth waves, comprising in combination a first and second electron tubes each having a cathode, a grid and a plate, means including a common cathode impedance to connect the cathodes to the negative terminal of a source of direct current potential, a first impedance connected between the plate of the first tube and the positive terminal of said source, a direct connection between the plate of the second tube and the same terminal of the source, a condenser connected between the plate of the first tube and the grid of the second, a resistor connected between the latter grid and said negative terminal, a resistance and condenser connected in series between the plate of said first amplifier and the negative terminal of said source in such a manner that negatively sloped sawtooth voltage waves are developed across the last mentioned condenser.

3. An electronic sweep circuit, comprising in combination a source of potential, a first electron tube having at least a plate, a cathode and a grid, a second electron tube having at least a plate, a cathode and a grid, a condenser connected between the plate of the first tube and the grid of the second, an impedance connected between the latter grid and one side of said source, a connection between the cathodes of the tubes, an impedance connected between said latter connection and the same side of said source, means including the source of potential for maintaining the plates positive with respect to their associated cathodes, and a resistance and condenser connected in series between the plate of the first tube and the said one side of said source in order that negatively sloped sawtooth voltage waves may be developed across said condenser.

4. A device such as is described in claim 3 in which the amount of impedance between the grid of the second tube and the said one side of potential is variable so as to allow the negatively sloped sawtooth wave to be synchronized with any series of synchronizing pulses spaced uniform with respect to time.

5. A sweep generator of the free running type that is capable of simultaneously generating positive and negative sloped sawtooth waves comprising a first tube having at least a plate, a cathode and a grid, a second tube having at least a plate, a cathode and a grid, a source of direct current potential, a first impedance and a condenser connected in series with said source, means to connect the plate of the second tube to the junction of the first impedance and the condenser a second impedance, means for electrically connecting the cathodes of said tubes to said second impedance, means for electrically connecting the second impedance to the negative terminal of said source of potential, a third impedance electrically connected between the plate of said first tube and the grid of the second, means including a load impedance and the source of potential to maintain the plate of the first tube positive with respect to its cathode, and an integrating circuit connected between the plate of the first tube and the negative terminal of said source, whereby positively sloped sawtooth waves are developed across said first named condenser and negatively sloped sawtooth waves are developed by said integrating circuit.

EARL I. ANDERSON.

REFERENCES CITED

The following references are of record in the file of this patent:

UNITED STATES PATENTS

| Number | Name | Date |
|---|---|---|
| 2,157,533 | Geiger | May 9, 1939 |
| 2,185,363 | White | Jan. 2, 1940 |
| 2,412,542 | Smith | Dec. 10, 1946 |
| 2,432,188 | Bliss | Dec. 9, 1947 |